Nov. 20, 1934.  G. LUFKIN  1,981,238
MACHINE FOR FORMING GLASS ARTICLES
Filed Oct. 31, 1930  4 Sheets-Sheet 2

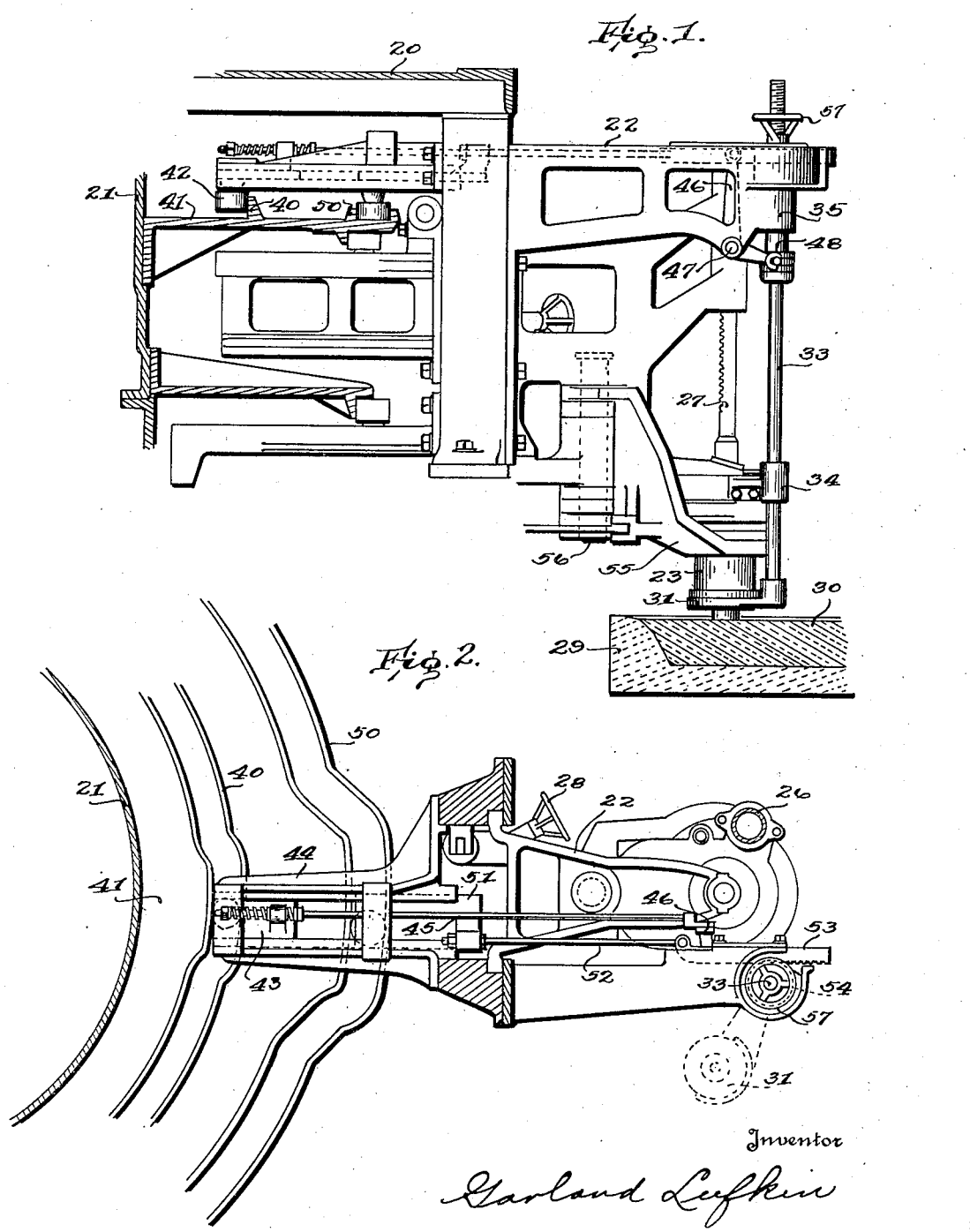

Inventor
Garland Lufkin
By J. F. Rule,
Attorney

Nov. 20, 1934.  G. LUFKIN  1,981,238
MACHINE FOR FORMING GLASS ARTICLES
Filed Oct. 31, 1930  4 Sheets-Sheet 3

Inventor
Garland Lufkin
By
J. F. Rule, Attorney

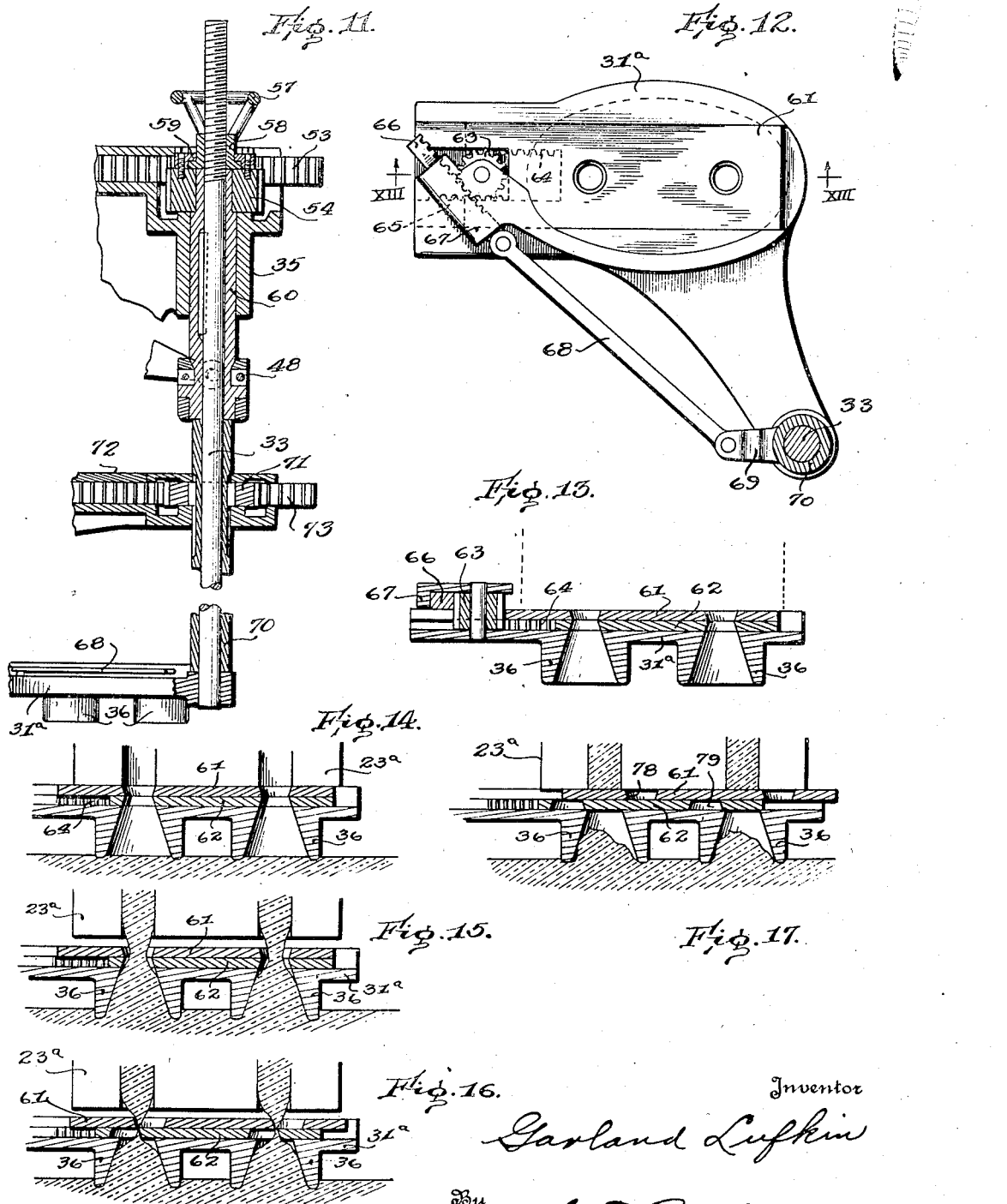

Patented Nov. 20, 1934

1,981,238

UNITED STATES PATENT OFFICE

1,981,238

MACHINE FOR FORMING GLASS ARTICLES

Garland Lufkin, Toledo, Ohio, assignor to Owens-Illinois Glass Company, a corporation of Ohio Application October 31, 1930, Serial No. 492,380

13 Claims. (Cl. 49—5)

My invention relates to machines in which mold charges of molten glass are introduced by suction into molds and formed into bottles, jars, or other glass articles. The invention relates particularly to the mechanism for gathering and severing the mold charges of glass. In machines of the suction gathering type, it is customary to mount the molds on dip frames carried on a horizontally rotating mold carriage, the molds being brought in succession over a tank or pool of molten glass. As a mold is brought over the glass, the dip frame is lowered to bring the mold into contact with the glass so that it may be filled by suction. The dip frame is then raised to lift the mold from the glass, permitting the glass to be severed and the mold to clear the tank.

An object of my invention is to provide a novel mechanism cooperating with the mold for introducing the charges of glass and severing them without lowering and raising the molds. According to the present invention, the molds may travel continuously in the same horizontal plane so that the usual dip frame and its operating mechanism for lifting and lowering the molds may be dispensed with.

A further object of the invention is to provide improved cut-off mechanism which operates in a manner to prevent or substantially eliminate the usual cut-off scar.

Other objects of the invention will appear hereinafter.

In the accompanying drawings:

Fig. 1 is a part sectional elevation showing one unit or head of a machine embodying the principles of my invention.

Fig. 2 is a part sectional plan view of the same.

Figs. 8 to 17, inclusive, illustrate a modification comprising plural molds and cutters separate from the funnel guides.

Figure 8:
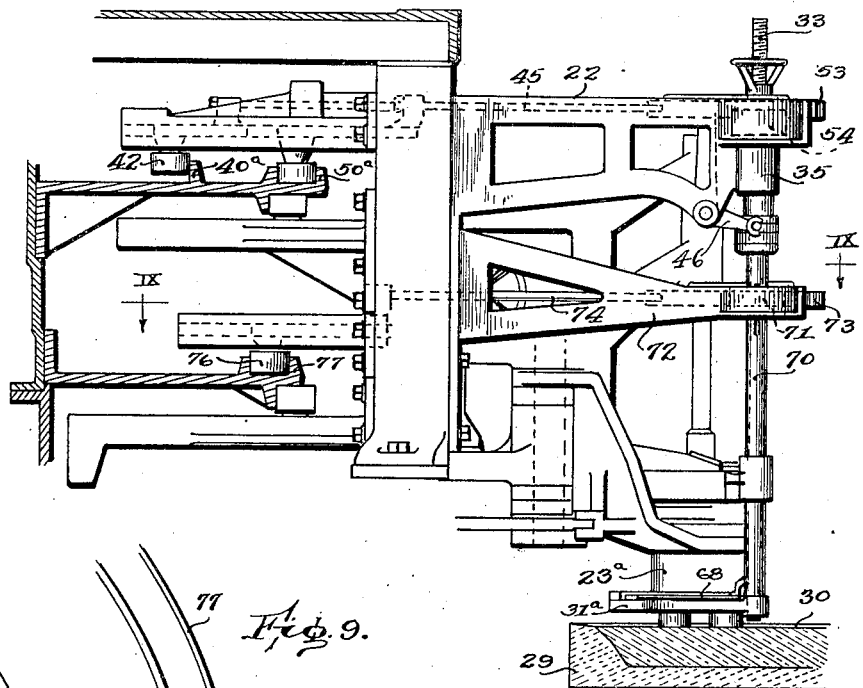

Fig. 8 is a sectional side elevation of the modified form of machine.

Figure 9:
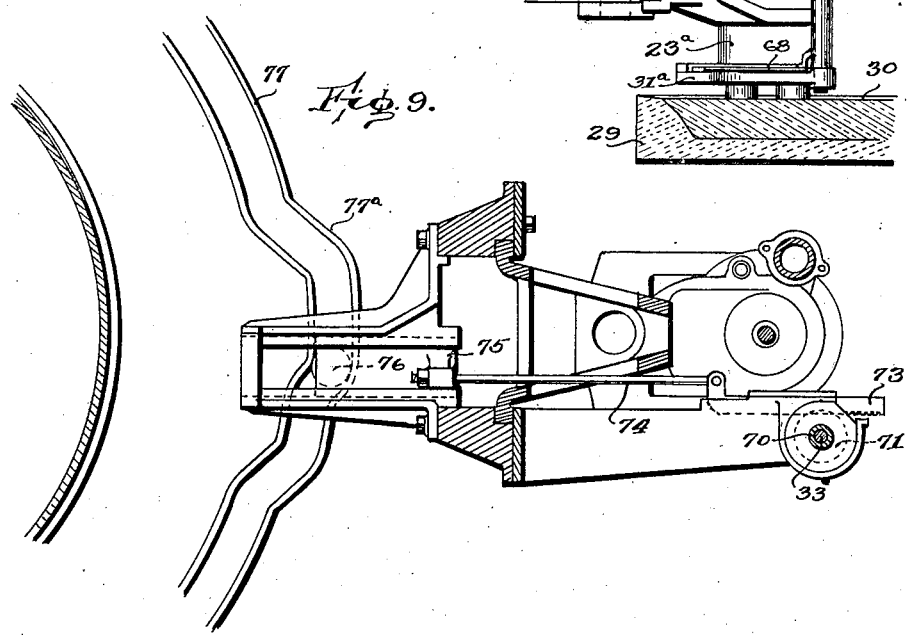

Fig. 9 is a sectional plan at the line IX—IX on Fig. 8.

Figure 10:
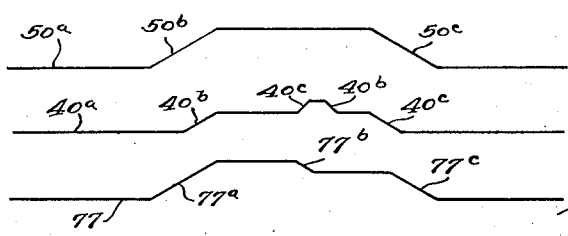

Fig. 10 is a diagram of the cams.

Fig. 11 is a sectional elevation of the rock shaft which carries the cutters, and associated mechanism.

Fig. 12 is a sectional plan showing the rock arm and cutter mechanism thereon.

Fig. 13 is a section at the line XIII—XIII on Fig. 12.

Figs. 14 to 17, inclusive, are sectional views of the guide plate and cutters, said views showing progressive steps in the operation of gathering and severing charges of glass.

Figure 3:
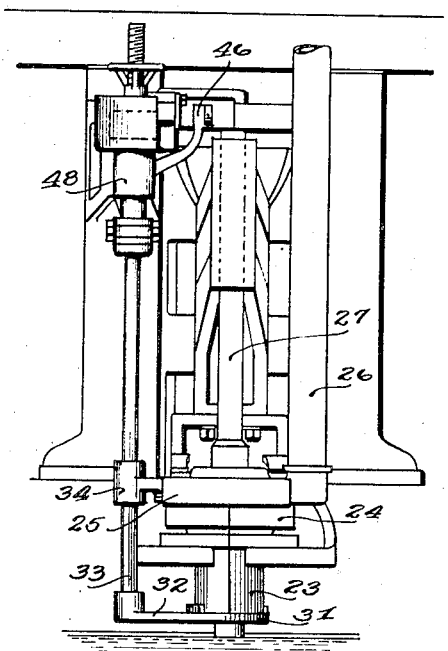
Fig. 3 is a front elevation.
Figure 5:
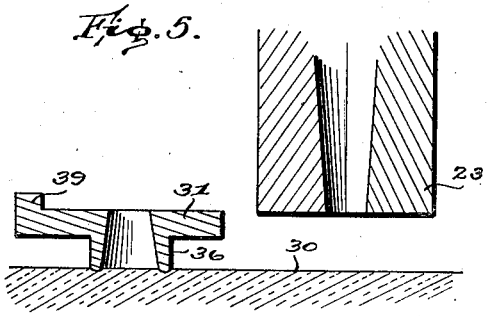

Referring particularly to Figs. 1, 2, and 3, the machine comprises a mold carriage 20 which may rotate continuously about a central column 21, said carriage comprising a plurality of heads or units 22, on each of which is mounted a mold group including a blank gathering mold 23 and a neck mold 24 above and in register with the blank mold. Above the neck mold is a combined suction and blowing head 25 which operates in the manner usual to Owens suction type machines, for exhausting the air from the molds to gather a charge of glass, and for supplying air under pressure for compacting the glass in the parison mold and for blowing it in the finishing mold. Suction is applied through a vacuum pipe 26. A plunger rod 27 is movable up and down for retracting and projecting the plunger as usual for forming the initial blow opening in the parison.

The head or frame 22 which carries the mold group is preferably adjustable up and down on the mold carriage, the adjustment being effected by a hand wheel 28 and associated mechanism (not shown in detail). Such adjustment permits the height of the gathering mold to be adjusted relative to a gathering tank 29 and supply body 30 of glass therein. Except for such adjustment, the gathering mold is maintained at the same level throughout its rotation with the mold carriage.

A combined glass gathering device and cutter, comprising a plate 31, is carried on or formed integral with a horizontal rock arm 32 secured to the lower end of a vertical rock shaft 33 journaled in bearings 34 and 35 on the frame 22. The plate 31 is formed with a downward extension 36 and a downwardly and outwardly flared or tapered opening 37 extending through the plate and said extension. This structure forms a funnel guide through which the glass is drawn into the blank mold. The opening 37 which is circular in cross-section is preferably the same diameter at its upper end as the lower end of the mold cavity 38 in the blank mold 23.

Figure 4:
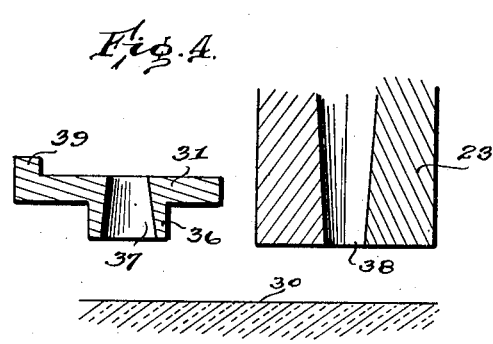
Figs. 4 to 7 are views showing the mold and the combined funnel guide and cutter plate, and their relative positions at successive steps in the operation of gathering and severing a mold charge of glass.
Figure 6:
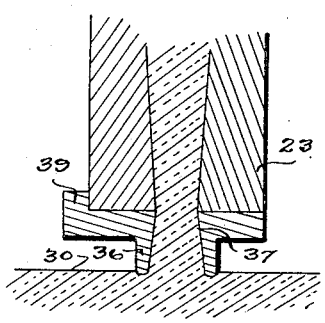
Figure 7:
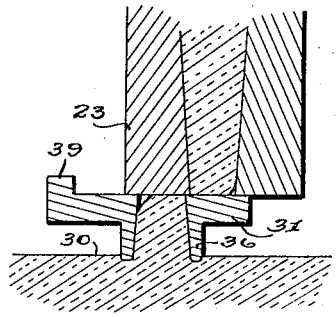

The shaft 33 is mounted for vertical and rocking movements to carry the plate 31 from the Fig. 4 position at one side of the mold to the Fig. 6 position in which it is beneath the mold and the opening 36 in register with the mold cavity, all as more fully hereinafter set forth.

A semi-circular rib or flange 39 formed on the plate 31 engages the mold and serves as a stop to limit the swinging movement of said plate and hold it in register with the mold cavity.

The rock shaft 33 is moved up and down by means of a stationary cam 40 on a cam plate or spider 41 mounted on the column 21. A cam roll 42 running on the cam 40 is carried on a slide 43 mounted to reciprocate radially of the mold carriage in guides formed on an arm 44 on the carriage. A rod 45 connects the slide with one arm of a bell crank 46 pivoted at 47 on the frame 22. The other arm of the bell crank has a connection 48 with the rock shaft 33 for lifting and lowering it. The shaft 33 is rocked by means of a stationary cam 50 on the plate 41. A slide 51 mounted to reciprocate on the arm 44, carries a roll running on the cam 50 and is connected through a rod 52 to a rack 53 which drives a pinion 54 on the rock shaft 33.

The blank mold 23 comprises horizontally separable sections carried on arms 55 mounted to swing about a pivot pin 56 for opening and closing the mold. The neck mold 24 also comprises separable sections mounted to swing about the pivot 56, the molds being actuated by the usual mechanism.

The operation of the machine shown in Figs. 1 to 7 is as follows:

As the mold carriage rotates, each blank mold is carried to a gathering position over the gathering tank 29. As the mold approaches the gathering position, the cam 50 operates to rock the shaft 33 and thereby swing the guide plate 31 from the dotted line position (Fig. 2) to the Fig. 4 position at one side of and in proximity to the mold. After the guide plate passes over the rim of the pot 29 to a position over the glass and nears the mold, the cam 40 operates to lower the rock shaft and plate to the Fig. 5 position in which the upper face of said plate is substantially on a level with the lower face of the mold. This brings the funnel guide 36 into sealing contact with the glass 30. The continued rotation of the shaft 33 carries the guide plate to the Fig. 6 position in which the opening 37 registers with the mold cavity. The air is now exhausted from the mold, causing the glass to enter and fill the mold cavity. The cam 50 now operates to rock the shaft 33 in the reverse direction through an angle sufficient to move the plate 31 to the Fig. 7 position, thereby severing the glass. The edge of the mold which defines the lower end of the mold cavity and the edge of the plate 31 at the upper end of the opening 37, form a pair of shear elements for shearing the glass. The cam 50 is preferably so shaped that the plate 31 is given a quick movement from the Fig. 6 to the Fig. 7 position for shearing the glass and then temporarily held in such position or moved slowly therefrom so that said plate forms a temporary bottom closure for the mold, permitting the glass to be compacted in the mold. The guide plate 31 then continues its lateral movement and after passing beyond the mold is again lifted out of contact with the glass and into a position to clear the rim of the tank. The subsequent operations of transferring the parison to a finishing mold and blowing it therein, are not herein described, as they form no part of the present invention.

The modified construction illustrated in Figs. 8 to 17 will now be described. The guide plate 31$^a$ is in this instance provided with a plurality of funnel guides 36 corresponding in number and arrangement to the plural mold cavities in the blank mold 23$^a$. The rock shaft 33 and parts carried thereby are adjustable vertically by means of a hand wheel 57 (Fig. 11) on a threaded sleeve 58 engaging screw threads formed on the shaft 33. A collar 59 secured to the pinion 54 prevents relative vertical movement of the pinion and said sleeve 58. The pinion 54 is fixed to a bearing sleeve 60 splined on the shaft 33 and journaled to rotate in the bearing 35. By rotating the hand wheel 57, the shaft 33 may be adjusted up and down in the bearing sleeve 60, thereby adjusting the height of the guide plate 31$^a$ and parts carried thereon. The pinion 54, as shown in Fig. 11, seats on the upper end of the bearing 35, thereby determining the lowered position of the guide plate 31$^a$. The latter is lifted by a cam 40$^a$ operating through rod 45 and bell crank 46.

Mounted on the guide plate 31$^a$ are upper and lower cutter plates 61 and 62. These cutters are mounted to reciprocate lengthwise of the plate 31$^a$ and are actuated by mechanism including a pinion 63 mounted on the plate 31$^a$. Rack teeth 64 on the plate 62 mesh with the pinion at one side thereof, and rack teeth 65 on the upper plate 61 mesh with the pinion at the opposite side thereof. A rack bar 66 mounted to reciprocate in a diagonally disposed guide 67 drives the pinion 63. Said rack is connected through a link 68 with a rock arm 69 on a tubular rock shaft or sleeve 70 mounted on the rock shaft 33 for rotation relative thereto. The tubular shaft 70 has keyed thereto a pinion 71 journaled in an arm 72 on the frame 22. A rack 73 running in mesh with the pinion 71 is connected through a rod 74 with a slide block 75 mounted to reciprocate radially of the mold carriage and carrying a cam roll 76 which runs on a stationary cam track 77. This cam track operates through the connections just described to simultaneously reciprocate the knife plates 61 and 62 in opposite directions, as more fully set forth hereinafter.

The operation of the mechanism shown in Figs. 8 to 17, is as follows:

As the mold carriage rotates and the mold 23$^a$ approaches the gathering position, the cam 50$^a$ operates to rock the shaft 33 for swinging the guide plate and cutters beneath the mold. This swinging movement is effected by a section 50$^b$ (Fig. 10) of the cam. As the guide plate nears the mold and after it has passed over the rim of the tank, a section 40$^b$ (Fig. 10) of the dip cam 40$^a$ operates to lower said plate so that it can move beneath the mold to a position in which the funnel guides register with the mold cavities, as shown in Fig. 14. During the rotation of the rock shaft 33 by means of the cam section 50$^b$, a section 77$^a$ of the cam 77 operates to rotate the sleeve 70 and pinion 71 at the same angular speed as the shaft 33 so that there is no relative rotation of said shaft and sleeve. There is, therefore, no reciprocating movement of the cutters due to the swinging of the guide plate into position. Openings 78 and 79 in the upper and lower cutter plates, respectively, are now in register with the funnel guides and mold cavities, and the funnel guides are in sealing contact with the glass. Suction is now applied so that the glass is drawn upward and fills the mold cavities. A section 40$^c$ of the cam 40$^a$ now operates to lower the rock shaft so that the cutter plates are spaced below the mold as shown in Fig. 15, thus providing clearance which permits the cutters to operate without shearing the glass above the upper cutter plate. The lowering of the gathering funnels and cutters also serves to constrict or neck in the glass at the cutting plane. This necking in is due in part to the downward pull of the funnel guides on the glass in combination with the action of gravity and the upward pull of the glass in the molds due to the suction which is still maintained. As the guide plate moves downward, a section 77ᵇ of the cam 77 operates the cutters to sever the glass, the edges of the openings 78 and 79 in the shear plates or cutters providing shearing edges. Fig. 16 shows the shears just as they are completing the severance of the glass and it will be noted that the edges of the shears meet substantially at the vertical axes or center lines of the mold cavities. The movement of the cutters continues a certain distance beyond the point at which the severance is completed, bringing the cutters to the relative position shown in Fig. 17. As soon as the severance is completed, a section 40ᵇ of the dip cam operates to lift the rock shaft so that the upper cutter plate 61 is brought into engagement with the bottom surface of the mold and serves as a closure for the mold cavity. The glass may now be compacted in the mold by a momentary puff of air in the usual manner. A section 50ᶜ of the cam 50ᵃ now operates to rock the shaft 33 and swing the guide plate and cutters from beneath the mold. As they clear the mold, a section 40ᶜ of the dip cam operates to lift the shaft to its initial position. A section 77ᶜ of the shear cam also operates to bring the shears to their initial position.

Modifications other than those herein disclosed may be resorted to within the spirit and scope of my invention.

What I claim is:

1. The combination of a suction gathering mold, a glass gathering device interposed between the mold and a supply body of molten glass, said device formed to provide a passageway through which glass is drawn from the supply body into the mold cavity, a pair of shears interposed between said gathering device and the mold and provided with openings therethrough in register with said passageway and mold cavity, and means for moving said shears in opposite directions from said position of register with the mold cavity and relative to the mold and gathering device and thereby severing the glass.

2. The combination with a traveling mold carriage, of a suction gathering mold thereon, a glass gathering device mounted to travel with the mold carriage and periodically interposed between the mold and a supply body of molten glass, a cutter plate interposed between the gathering device and the mold, said device and cutter plate having openings therethrough aligned with the mold cavity through which the glass enters the mold, and means moving the cutter plate laterally for severing the glass.

3. The combination with a suction gathering mold of a glass gathering device, a pair of cutter plates mounted thereon between said device and the mold, said gathering device and cutter plates formed to provide a passageway therethrough in register with the mold cavity through which glass enters the mold, and means for simultaneously moving the cutter plates laterally in opposite directions on the gathering device from a position in line with the mold cavity and thereby severing the glass.

4. In combination, a suction gathering mold open at its lower end, a pair of cutter plates beneath the mold having aligned openings therethrough in line with the mold cavity, means for causing molten glass to enter the mold through said aligned openings, and means for simultaneously moving the cutter plates laterally in opposite directions from their said aligned position and thereby severing the glass.

5. In combination, a suction gathering mold open at its lower end, a pair of cutter plates beneath the mold having aligned openings therethrough in line with the mold cavity, means for holding the cutter plates in sealing contact with each other and with the mold, means for causing molten glass to enter the mold through said openings, means for then separating the mold from the cutter plates by a relative vertical movement of the mold and cutter plates, and means for then simultaneously moving said plates transversely in opposite directions and thereby severing the glass.

6. In combination, a suction gathering mold open at its lower end, a pair of cutter plates beneath the mold having aligned openings therethrough in line with the mold cavity, a gathering device on which the cutter plates are mounted, said gathering device formed with a passageway therethrough in register with said openings, means for causing glass to move upward by suction from a supply body through said passageway and openings into the mold, and means for reciprocating the cutter plates on said gathering device.

7. In combination, a suction gathering mold open at its lower end, a pair of cutter plates beneath the mold having aligned openings therethrough in line with the mold cavity, a gathering device on which the cutter plates are mounted, said gathering device formed with a passageway therethrough in register with said openings, means for causing glass to move upward by suction from a supply body through said passageway and openings into the mold, means for separating the mold and cutter plates by relative vertical movement, and means for then simultaneously moving the cutter plates transversely in opposite directions and thereby severing the glass.

8. The combination of a mold carriage, a mold thereon having a downwardly opening mold cavity, a container for a pool of molten glass, means for rotating the carriage and causing the mold to periodically pass over said container and the pool of glass therein, means for maintaining the mold at a constant level throughout its passage over the container, a gathering device having a passageway therethrough, said device mounted to travel with the mold carriage at a level above the bottom level of the mold and above the rim of the container, and means operable while the gathering device is traveling over the container to lower it from its said level into contact with the pool of glass and shifting it laterally into a position beneath the mold in which said passageway extends from the pool to the mold cavity.

9. The combination with a container for a supply body of molten glass presenting an exposed gathering surface, of a horizontally traveling mold carriage, a suction gathering mold thereon having a bottom opening for the entrance of glass into the mold, means for causing the mold to travel over the said container and for maintaining it at a constant level throughout its passage over the container, a gathering device mounted to travel with the mold carriage in a place above the rim of said container, means for periodically lowering said gathering device while traveling over the container into sealing contact with said surface and shifting it laterally to a gathering position between the mold and the glass in the container, and means for causing glass to enter the mold through said gathering device.

10. The combination with a container for a supply body of molten glass presenting an exposed gathering surface, of a horizontally traveling mold carriage, a suction gathering mold thereon having a bottom opening for the entrance of glass into the mold, means for causing the mold to travel over the said container and for maintaining it at a constant level throughout its passage over the container, a glass gathering device mounted on the mold carriage in a plane above the rim of said container, and means for periodically lowering said gathering device while traveling over the container and shifting it laterally to a position beneath the mold while the latter is traveling over the container, said gathering device being formed to provide a passageway between the supply body of glass and the said mold opening.

11. The combination with a container for a supply body of molten glass, of a horizontally travelling mold carriage, a suction gathering mold thereon having a bottom opening for the entrance of glass into the mold, said mold positioned and arranged to travel over the said container, means for maintaining the mold at a constant level throughout its passage over the container, a gathering device mounted on the mold carriage at one side of the mold at a level above the bottom level of the mold and above the rim of the container, said gathering device formed with a passageway therethrough, and means operable while the gathering device is traveling over the container, to lower it from its said level and then shift it laterally to a position beneath the mold with said passageway in register with said mold opening, the gathering device when in said last mentioned position extending below the level of the rim of the container.

12. The combination of a horizontally rotating mold carriage, a suction gathering mold thereon having a bottom opening through which glass can enter the mold, a container for molten glass, said mold arranged to periodically travel over the container, means for maintaining the mold at a constant level throughout its travel over the container, a combined glass gathering and severing device mounted on the carriage at one side of and above the bottom level of the mold and above the level of the rim of the container, means operating while said device is traveling over said container to lower said device below said rim and move it laterally to a position beneath the mold, said device formed with a passageway therethrough to register with the mold opening, means for causing glass to enter the mold by suction through said passageway, means for then moving said device laterally and causing it to sever the glass, and means for lifting said device above said rim and the bottom level of the mold after severance of the glass and while traveling over the said container.

13. The combination of a horizontally rotating mold carriage, a suction gathering mold thereon having a bottom opening through which glass can enter the mold, a container for molten glass, said mold arranged to periodically travel over the container and carried at a constant level throughout its travel over the container, a combined glass gathering and severing device mounted on the carriage at one side of and above the bottom level of the mold and above the level of the container rim, means operable while said device is traveling over the container to lower said device and move it laterally to a position beneath the mold, said device formed with a passageway therethrough to register with the mold opening, means for causing glass to enter the mold by suction through said passageway, means for then moving said device laterally while held in shearing contact with the mold and thereby causing it to sever the glass, and means for lifting said device above said rim and the bottom level of the mold after severance of the glass and while traveling over the said container.

GARLAND LUFKIN.